United States Patent [19]

Neitzel

[11] 3,993,202

[45] Nov. 23, 1976

[54] STORAGE SYSTEM WITH ADJUSTABLE INTERCONNECTED CRANE TOWERS

[75] Inventor: Hans Walter Neitzel, Weinheim, Germany

[73] Assignee: Mannesmann Aktiengesellschaft, Dusseldorf, Germany

[22] Filed: July 26, 1975

[21] Appl. No.: 598,763

[30] Foreign Application Priority Data

Aug. 2, 1974 Germany ........................... 2437208

[52] U.S. Cl. ........................... 214/16.4 A; 280/638; 212/124; 214/730

[51] Int. Cl.² ........................................... B65G 1/06

[58] Field of Search ................. 214/16.4 A, 16.4 B, 214/16.4 C, 620, 730; 212/10-13, 124-125, 140-142; 280/638

[56] References Cited

UNITED STATES PATENTS

| | | | |
|---|---|---|---|
| 3,090,494 | 5/1963 | Thiele | 214/620 X |
| 3,727,778 | 4/1973 | Hollenbach | 214/75 R |
| 3,779,403 | 12/1973 | Young | 214/16.4 A |

*Primary Examiner*—Robert J. Spar
*Assistant Examiner*—R. B. Johnson
*Attorney, Agent, or Firm*—Ralf H. Siegemund

[57] ABSTRACT

A storage facility with spaced apart shelf frames has a two tower crane between respective two frames which are spaced by about a container width. Each tower of the crane has a motor driven carriage and an up and down moving elevator with laterally extensible holders for containers. The spacing between the two towers is defined by distance adjustable connectors, which provide for fine tower positioning and locking to adjust the tower spacing to different container lengths.

5 Claims, 7 Drawing Figures

Fig.1
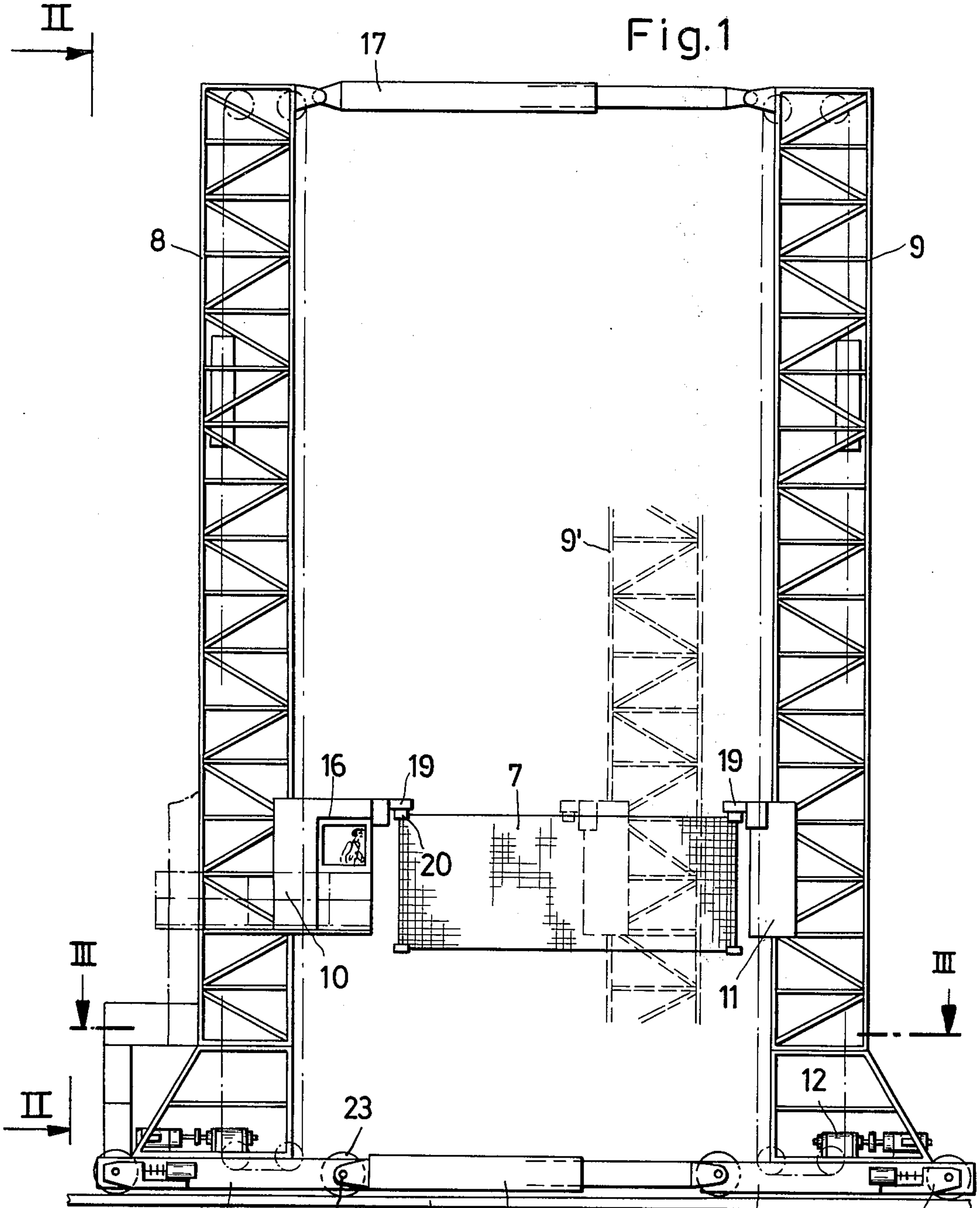
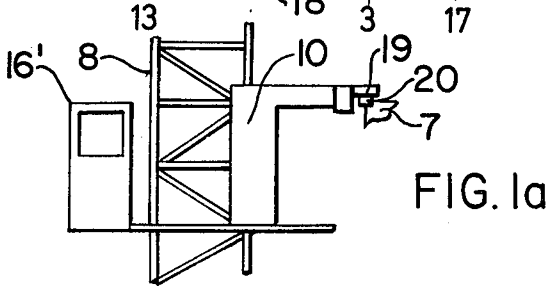
FIG. 1a

STORAGE SYSTEM WITH ADJUSTABLE INTERCONNECTED CRANE TOWERS

BACKGROUND OF THE INVENTION

The present invention relates to a storage facility for freight containers having at least two frames for shelves, each frame for storing containers in vertically stacked rows of storage spaces.

This type of storage facility is already known and it usually includes a loading crane which moves between the frames and is provided with gripping means or the like for engagement with the corner fittings of the containers. These gripping means are adjustable, because the containers are differently long. The German printed Pat. application No. 2,009,520, (corresponding to U.S. application Ser. No. 803,838 filed Mar. 3, 1969 now abandoned) discloses such a crane, which is movable between the shelf frames which in turn are spaced apart by a distance corresponding to the longest container type.

DESCRIPTION OF THE INVENTION

It is an object of the present invention to improve storage facilities of the type outlined above to increase access speed to the stored containers as well as to the storage locations as provided.

It is a specific object of the present invention to improve the crane structure for such a storage facility.

In accordance with the preferred embodiment of the present invention it is suggested to place two shelf frames apart by a distance merely slightly larger than the standardized width of differently long containers. The crane moves in the space between the shelves and is constructed from two units, each having a tower, a motordriven carriage for the tower and a motor driven up and down moving elevator. The two units (towers) are interconnected by means of at least two, distance adjustable spacer connectors which can be locked in different positions for different tower spacings. The elevators are provided with laterally extending holding arms for engagement with containers. Elevators and holding arms establish the container carrying facility of the crane which can be moved up and down along the shelf space and the arms move a container laterally (transverse as to the long dimension of the suspended container) to be shifted into and out of a shelf space.

Preferably, the two units are basically similar but of mirror image construction except that one of the elevators may have an operator cabin. The carriages of the towers may run on top rails along the frames, but preferably rails are provided on a bottom foundation, which may be the foundation or base of the entire facility.

The locking and positioning device for the tower interconnect structure can be constructed as known per se from German Pat. No. 2,200,834. Presently, this device moves the towers relative to each other for fine positioning and locks them into spaced positions corresponding to different container lengths.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a side elevation of a loading crane for containers of different lengths;

FIG. 1*a* is a fragmentary view of a modification

Figure 2:
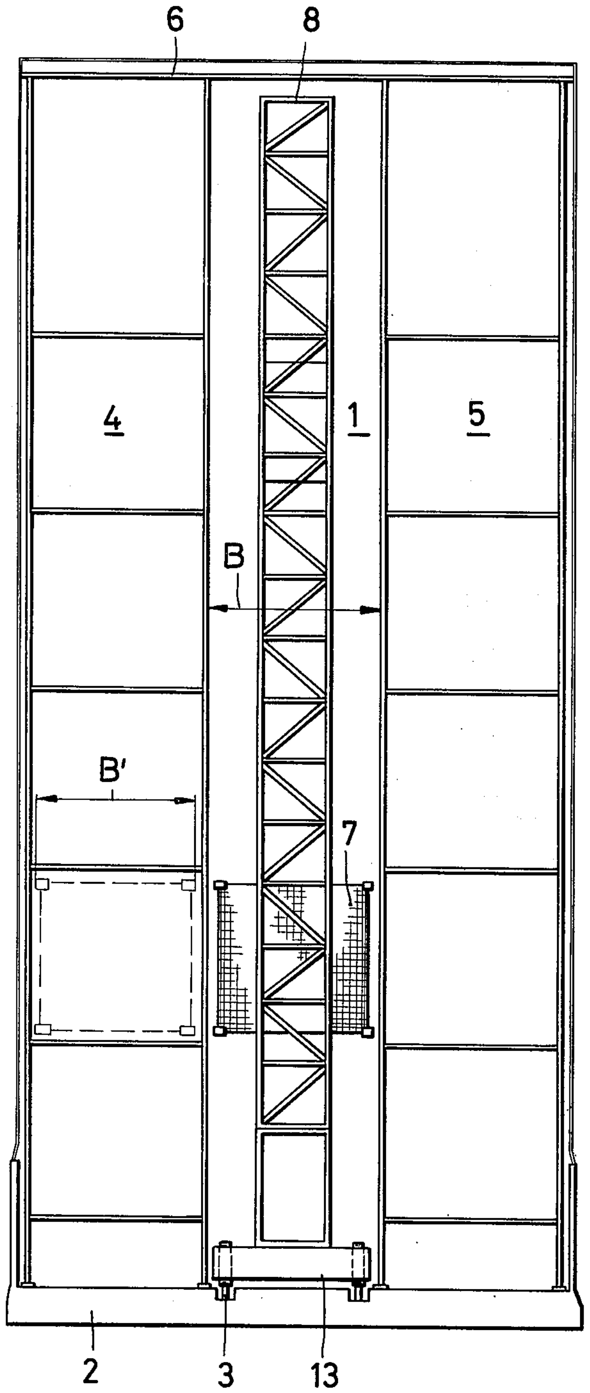
FIG. 2 is a view in direction of arrow II of FIG. 1 and includes a front view of a storage facility for such containers having two shelf frames and access space in which runs a crane, however, details of container carrying equipment have been excluded from the illustration of the crane in this figure.

Proceeding now to the detailed description of the drawings, the figures show two frames 4 and 5 for container shelves which are spaced apart by a distance B in FIG. 2, and the spacing defines the access space 1. The frames 4 and 5 are anchored to a foundation or base 2 and a pair of rails 3 are mounted on that portion of base 2 which defines the botom of access space 1. The rails may readily continue outside of the shelf space and extend towards a loading area. The frames 4 and 5 are interconnected at the top by means of cross-beams, such as 6.

The frames 4 and 5 hold a plurality of vertically spaced and stacked shelves, spaced by a vertical distance of about 3 meters.

The crane is basically constructed from two units respectively having towers or pillars 8 and 9. Each unit has a carriage, 13 and 14, respectively supporting the towers 8 and 9 and the carriages run on rails 3.

Each of the towers has an elevator 10 and 11, running on vertical tower rails and a container 7 can be suspended between the elevators. The width B of the shelf access space 1 corresponds approximately to the width B′ of the containers which is standardized and is the same for differently long containers. The towers are narrower than widths B and B′. The latter two widths differ essentially to the extent necessary to permit free movement of the containers in access space 1.

The elevators 10 and 11 are respectively raised and lowered by means of winches with drives 12 (one for each elevator). Each tower carriage has its own motor 15 constructed, for example, as gear motor. These motors are basically provided for independent movement, so that the towers with carriages can be moved towards and away from each other to adjust the crane to different container lengths. On the other hand, the towers are moved in unison on rails 3 in access space 1 and the two drives are controlled accordingly.

As can readily be seen from the drawings, the two towers and accessories are of symmetrical construction in that one is the mirror image of the other. However, elevator 10 is additionally provided with an operation cabin 16. As shown in FIG. 1*a*, the operation cabin 16′ may be on the outside. The two towers are interconnected at the top and bottom by spacer connections 17, which are telescoped and articulated or hinged to the respective tower tops and to the two carriages 13 and 14. The pivotal connecting points of hinge or articulated connection are denoted with reference numeral 18.

Figure 3:
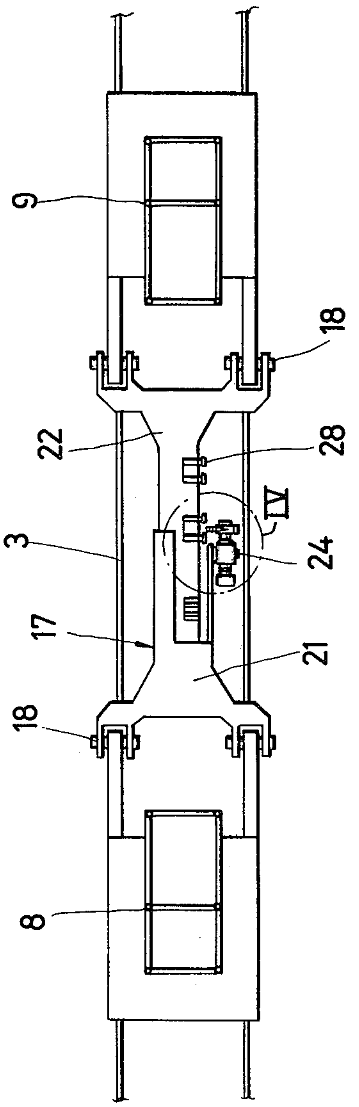
FIG. 3 is a section along line III—III in FIG. 1 showing further details.
Figure 5:
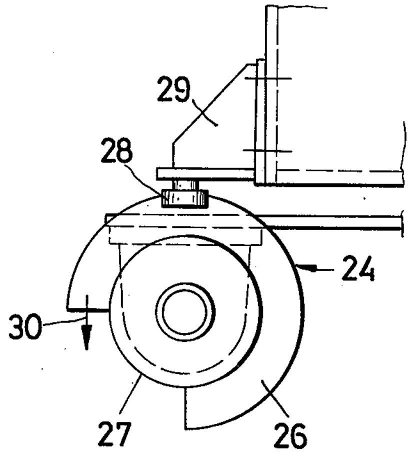
FIG. 5 is a view in direction of arrow V in FIG. 4.
Figure 4:
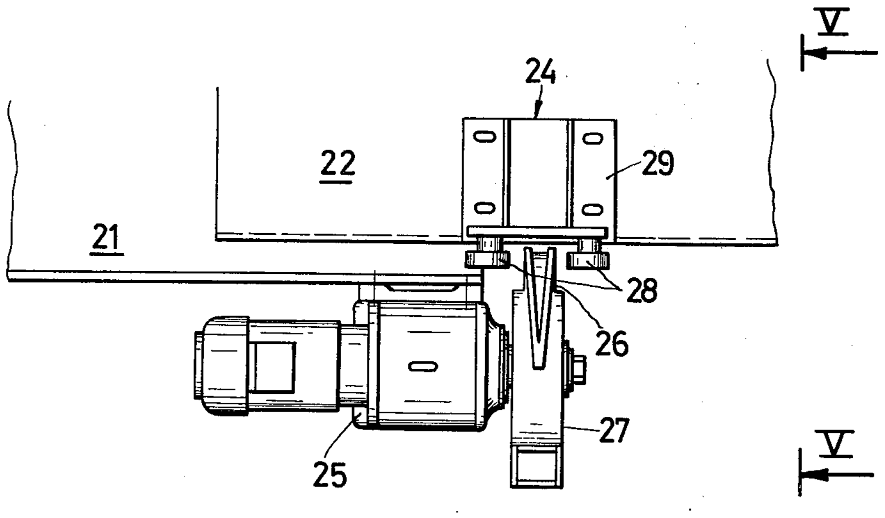
FIG. 4 is an elevation of the area marked IV in FIG. 3 in an enlarged scale.

Details of the connections 17 are illustrated in FIGS. 3, 4, and 5. They have each two telescoped elements 21 and 22 and additionally a finer positioning locking device 24 is provided for each spacer connection 17. These devices 24 are shown in greater detail in FIGS. 4 and 5. The connections 17 determine and maintain the spacing between crane towers 8 and 9. These connections are actually superfluous as to static conditions of the crane as well as in regard to driving of the crane as a whole. However, the connections take up compensating forces, if the two tower carriages move not precisely in unison. The connections 17 are very important to avoid any stress on a suspended container in such a case.

The two elevators 10 and 11 (or more accurately, cabin 16 and elevator 11) each are provided with a load carrying arm 19. These arms are telescoped in the direction perpendicular to the plane of the drawing in FIG. 1. These carrier arms 19 receive, engage and hold a container such as 7, and the telescoping extensions permit lateral placement of the container from its suspension in space 1 into a shelf as indicated in dashed lines in FIG. 2. The containers are usually provided with corner fittings and holding arms 19 grip and engage the four upper corner fittings of the container.

If one assumes that FIG. 1 is drawn to scale, then the containers are of the 40' length variety. However, the same crane can handle also 20' containers. For the latter case, tower 9 is shifted towards tower 8 and assumes the dashed position in FIG. 1. For a still farther position to the left of tower 9 one can readily handle 10' containers. The frames 4 and 5 and shelving with partitions are spaced in the direction transverse to the plane of FIG. 2, so that a 40' container fits readily in one shelf (or two 20' containers, etc.) One can, of course, provide for smaller shelf and frame spacing just for these smaller containers. However, one can readily see that each container is directly from space 1 and will not be hidden by another one in front.

The two parts 21, 22 of a telecoped connection 17 as provided with locking mechanism 24 permit locking of the towers in particular positions relative to each other. The mechanism 24 is comprised of a gear motor 25 for driving a rotatable wedge and cam disk 27, having thread-like surfaces 26 of opposite pitch to provide wedge-like cam action. Complementary thereto is a pair of rollers 28. The gear motor 25 is mounted to part 21, so that cam disk 27 is effectively connected to that part (and to tower 8); the rollers 28 are journalled in a block 29, which in turn is connected to tower 9.

Only one pair of rollers 28 with bearing and journal block 29 are shown in FIG. 4. However, altogether three such pairs are arranged on part 22 (see FIG. 3), whereby two pairs are spaced 20' apart and the third pair is placed 10' from the right-most one of the first two. This spacing of the pairs 28 from each other correspond to the container lengths to be accommodated, namely 40', 20', and 10' and defines, therefore, a set of locking positions needed for that purpose. It should be noted that the dimensions as illustrated in FIG. 3 are not drawn to scale and particularly not to the same scale of FIG. 1. Furthermore, the number of roller pairs 28 is basically arbitrary and depends on the number of different container sizes.

FIGS. 4 and 5 illustrate an operational state according to which the wedge cam disk 27 turns in the direction of arrow 30. Thus, the device is neither in the fully locked nor in the fully released state. Particularly, in FIG. 5, disk 27 has a position which is 130° — counterclockwise, displaced from the fully released state and position and is reached by clockwise rotation of disk 27, while the locking state requires a 170° counterclockwise rotation of disk 27 from the illustrated position.

As long as device 24 is in the released state, disk 27 has a disposition so that it clears rollers 28 and part 22 can be moved relative to part 21 without hindrance by the locking mechanism. This displacement may be needed to shorten the spacing as defined by the connection 17 as comprised of telescoped parts 21 and 22. In the connect state, the wide (axially) portion of wedge disk 27 fills the space between the rollers of the respective pair 28 and locks against both of them.

The relative movement of parts 21 and 22 is provided by moving one or the other or both tower carriages 13, 14 relative to each other by means of the respective drives. This should place the cam disk 27 centrally between the rollers of a pair. This holds true for the upper as well as for the lower connection 17. Now motors 25 turn the cam disks 27 and the latter lock in between the rollers of the respective pair. That turning motion may begin already when the desired position has been approximately reached and the narrow end of cam disk 27 fits already in between the rollers of a pair. One of the rollers may abut one side of the respective cam disk to obtain now a guided fine positioning of the parts 21 and 22 to each other, whereby the crane towers 8 and 9 are fine positioned accordingly. As soon as the thick or wide ends of the cam disks are wedged between the respective rollers the towers have the desired relative position and all connections 17 are locked in that position.

The fine adjustment may already begin while the towers still move relative to each other by operation of the respective carriage drive or drives. In this case, the towers are moved temporarily by combined action of the carriage drives and of the positioning devices 24. However, the tower carriages may have stopped already in a coarse adjustment position, so that the several drives 25 of positioning devices 24 now take over for fine positioning of the towers as a whole via cam action which is terminated when the disks 27 have reached a locking state.

Figure 6:
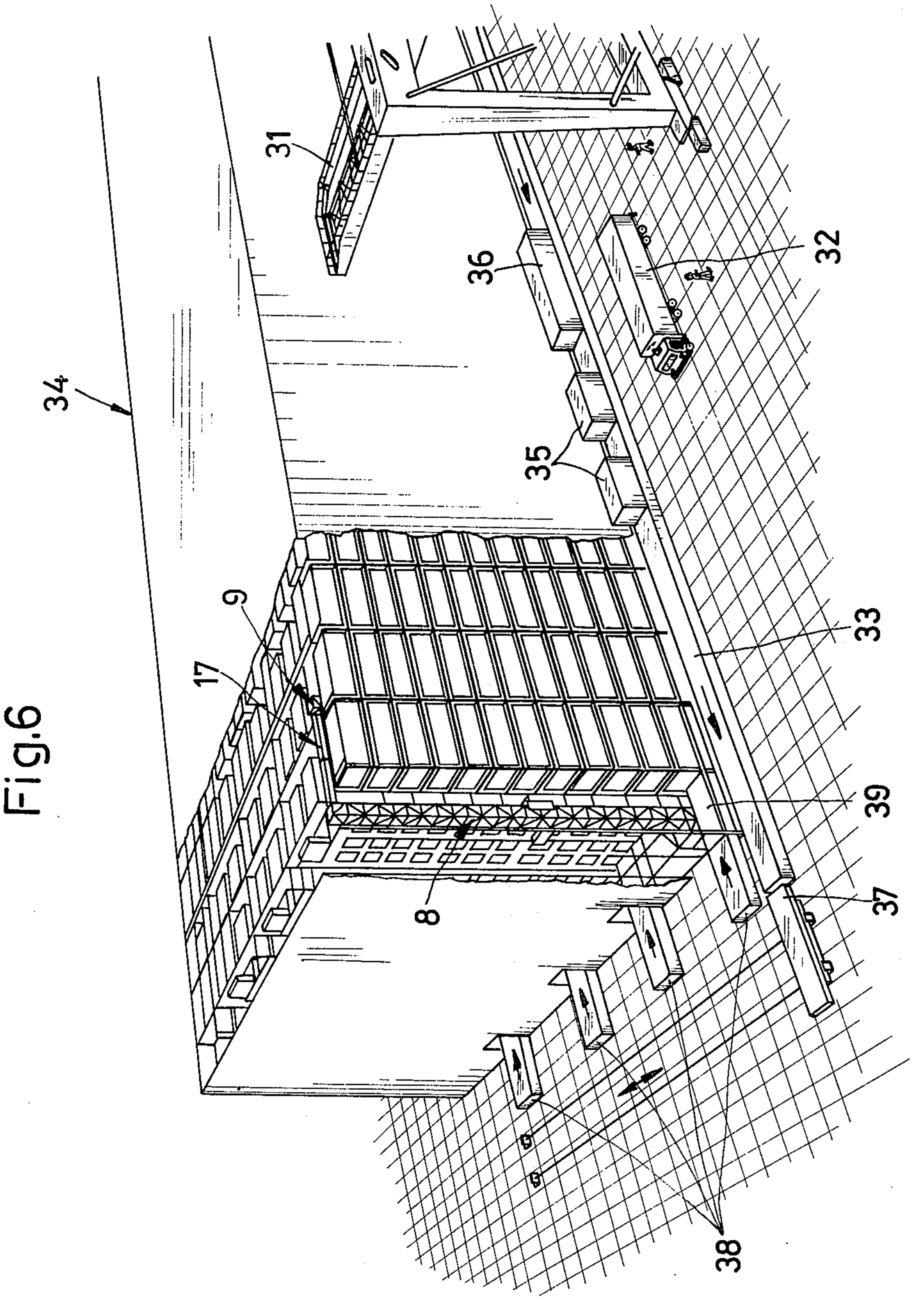
FIG. 6 is an overall perspective view of a storage facility with partially removed wall and ceiling.

The overall view of a storage facility 34 shown in FIG. 6 may have a large scale loading crane 31 for further container handling and a loading area comprised of a roller track 33 onto which are placed small containers 35 or large containers 36, when unloaded from trucks such as 32 or from a large crane 31. The roller track 33 extends alongside of one side of the storage facility. A roller track extension, constructed as transverse carriage 37, can be placed into alignment with track 33, so that a container can be rolled thereon. Subsequently, the carriage platform 37 is moved transversely, on illustrated rails to place the containers in alignment with entrance roller tracks 38 for the access space. As shown in the drawing, these entrance tracks 38 are offset from the respective access space between two shelf frames, but in line with one lower shelf 39. The particular two tower crane 1 being shown as 8, 9, 17, in FIG. 6 unloads the container from that particular lower shelf 39 and places the container into the shelf space to the left or to the right of the two tower crane as explained above.

The storage facility for containers in accordance with the prefered embodiment has higher access speed because the crane can move faster in the space between the shelf frames. On the other hand, transverse motion as provided by the platform carriages or roller track sections 37 will move slower, but covers only shorter distances. Also, due to the lengthwise storage of containers, small containers are as accessible as long one. This is not true for the known facility mentioned above, where short containers may be stored behind others.

Pallet storing facilities use single tower cranes with drivable carriages. These types of cranes can be used directly as well as in mirror image duplication so that the invention can readily be practiced under utilization of many already available components and substructures.

The invention is not limited to the embodiments described above, but all changes and modifications thereof not constituting departures from the spirit and scope of the invention are intended to be included.

I claim:

1. Storage facility for containers having at least two frames for shelves and spaced apart to define an access space, in which moves a loading crane, the improvement comprising:

the space between the two frames for shelves being only slightly larger than the width of a container;

the crane having two interconnected units, each unit comprising a tower, a motor-driven carriage respectively for the tower, the carriages of the towers provided for moving the towers in unison along and in said space as well as towards and away from each other, each unit further having a motor-driven elevator on and moving vertically along the respective tower of the unit;

carrying and loading arms respectively on the elevators for uniform lateral extension into the shelves and provided with means for connection to and suspension of a container between the elevators of the towers; and at least one upper and one lower connection between the towers each comprised of a pair of elements, distance adjustable to each other, and means for releasably interconnecting the elements in predetermined locking positions.

2. Storage facility as in claim 1 and including rails on a foundation of and between said frames, said carriages running on the frames.

3. Storage facility as in claim 1, wherein each unit as comprised of tower, carriage and elevator is of mirror image construction of the respective other unit, one of the elevators being additionally provided with an operator cabin.

4. Storage facility as in claim 1, the elements of said connections being telescoped and provided with a positioning and locking device for locking the connections in different positions.

5. Storage facility as in claim 4, wherein the locking device includes a rotatable cam disk on one element of a connection and a pair of rollers on the other element to define released and locking positions with the disk.

* * * * *